US009305242B2

United States Patent
Huang et al.

(10) Patent No.: US 9,305,242 B2
(45) Date of Patent: Apr. 5, 2016

(54) METHOD AND IMAGE PROCESSING APPARATUS FOR IMAGE VISIBILITY RESTORATION USING FISHER'S LINEAR DISCRIMINANT BASED DUAL DARK CHANNEL PRIOR

(71) Applicant: National Taipei University of Technology, Taipei (TW)

(72) Inventors: Shih-Chia Huang, Taipei (TW); Bo-Hao Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/460,378

(22) Filed: Aug. 15, 2014

(65) Prior Publication Data
US 2016/0048742 A1 Feb. 18, 2016

(51) Int. Cl.
G06K 9/00 (2006.01)
G06K 9/40 (2006.01)
G06K 9/62 (2006.01)
G06K 9/46 (2006.01)
G06T 5/00 (2006.01)
G06K 9/52 (2006.01)

(52) U.S. Cl.
CPC .............. *G06K 9/6256* (2013.01); *G06K 9/46* (2013.01); *G06K 9/4661* (2013.01); *G06K 9/52* (2013.01); *G06K 9/6267* (2013.01); *G06T 5/00* (2013.01); *G06K 2009/4666* (2013.01)

(58) Field of Classification Search
CPC ..... G06K 9/6256; G06K 9/6267; G06K 9/52; G06K 9/4661; G06K 2009/4666; G06K 9/66; G06K 9/6217; G06K 9/6282; G06T 5/00; G06F 17/30256

USPC .................. 382/159, 254, 260, 264, 100, 103
See application file for complete search history.

(56) References Cited

U.S. PATENT DOCUMENTS 8,775,555 B2 * 7/2014 Steinhauer .............. H04L 69/22
709/217
9,031,345 B2 * 5/2015 Jin .......................... G06T 5/003
382/254

(Continued)

OTHER PUBLICATIONS

Wu et al., "An Eye Localization, Tracking and Blink Pattern Recognition System: Algorithm and Evaluation," ACM Transactions on Multimedia Computing, Communications and Applications, Mar. 2010, pp. 8:1-8:23.

(Continued)

*Primary Examiner* — Sheela C Chawan
(74) *Attorney, Agent, or Firm* — Jianq Chyun IP Office (57) ABSTRACT

A method and an image processing apparatus for image visibility restoration are provided. The method includes the following steps. After an incoming hazy image is received, each of the incoming pixels is classified as either belonging to a localized light region or a non-localized light region. The localized light region is partitioned into patches according to each patch size in associated with image sizes in a training data set. Localized light patches are determined based on a FLD model and a designated patch size is accordingly determined. Adaptive chromatic parameters and dual dark channel priors corresponding to the designated patch size and a small patch size are determined. The incoming hazy image is restored according to the adaptive chromatic parameters, atmospheric light and a transmission map determined based on the dual dark channel priors to produce and output a de-hazed image.

20 Claims, 4 Drawing Sheets

(56) References Cited

U.S. PATENT DOCUMENTS

| | | | |
|---|---|---|---|
| 9,098,895 B2* | 8/2015 | Li | G06T 5/001 |
| 2014/0140619 A1* | 5/2014 | Mukhopadhyay | G06T 5/40 |
| | | | 382/167 |
| 2014/0198993 A1* | 7/2014 | Tan | G06T 5/003 |
| | | | 382/275 |
| 2014/0205192 A1* | 7/2014 | Wang | G06T 5/00 |
| | | | 382/167 |
| 2016/0005152 A1* | 1/2016 | Yang | G06K 9/40 |
| | | | 382/275 |

OTHER PUBLICATIONS

Snidaro et al., "Fusing Multiple Video Sensors for Surveillance," ACM Transactions on Multimedia Computing, Communications and Applications, Jan. 2012, pp. 7:1-7:18.

Mei et al., "Near-Lossless Semantic Video Summarization and Its Applications to Video Analysis," ACM Transactions on Multimedia Computing, Communications and Applications, Jun. 2013, pp. 16:1-16:23.

Hossain et al., "Modeling and Assessing Quality of Information in Multisensor Multimedia Monitoring Systems," ACM Transactions on Multimedia Computing, Communications and Applications, Jan. 2011, pp. 3:1-3:30.

Liu et al., "SEVA: Sensor-Enhanced Video Annotation," ACM Transactions on Multimedia Computing, Communications and Applications, Aug. 2009, pp. 24:1-24:25.

He et al., "Single Image Haze Removal Using Dark Channel Prior," IEEE Transactions on Pattern Analysis and Machine Intelligence, Dec. 2011, pp. 2341-2353.

Robby Tan "Visibility in Bad Weather from a Single Image," IEEE Conference on Computer Vision and Pattern Recognition, Jun. 23-28, 2008, pp. 1-8.

Raanan Fattal, "Single Image Dehazing," Proceedings of ACM SIGGRAPH 2008, Aug. 2008, pp. 1-9.

Tarel et al., "Fast Visibility Restoration from a Single Color or Gray Level Image," 2009 IEEE 12th International Conference on Computer Vision, Sep. 29-Oct. 2, 2009, pp. 2201-2208.

Yu et al., "Fast single image fog removal using edge-preserving smoothing," 2011 IEEE International Conference on Acoustics, Speech and Signal Processing (ICASSP), May 22-27, 2011, pp. 1245-1248.

Nishino et al., "Bayesian Defogging," International Journal of Computer Vision, Jul. 2012, pp. 263-278.

Xie et al., "Improved Single Image Dehazing Using Dark Channel Prior and Multi-Scale Retinex," 2010 International Conference on Intelligent System Design and Engineering Application, Oct. 13-14, 2010, pp. 848-851.

Xu et al., "Fast Image Dehazing Using Improved Dark Channel Prior," 2012 International Conference on Information Science and Technology (ICIST), Mar. 23-25, 2012, pp. 663-667.

Jin et al., "Single Image De-haze Based on a New Dark Channel Estimation Method," 2012 IEEE International Conference on Computer Science and Automation Engineering (CSAE), May 25-27, 2012, pp. 791-795.

Shwartz et al., "Blind Haze Separation," 2006 IEEE Computer Society Conference on Computer Vision and Pattern Recognition, Jun. 17-22, 2006, pp. 1984-1991.

Narasimhan et al., "Contrast Restoration of Weather Degraded Images," IEEE Transactions on Pattern Analysis and Machine Intelligence, Jun. 2003, pp. 713-724.

Kopf et al., "Deep Photo: Model-Based Photograph Enhancement and Viewing," ACM Transactions on Graphics (TOG), Dec. 2008, pp. 1-10.

Narasimhan et al., "Interactive (De)Weathering of an Image using Physical Models," IEEE Workshop on Color and Photometric Methods in Computer Vision, in Conjunction with ICCV, Oct. 2003, pp. 1-8.

Chen et al., Improved Visibility of Single Hazy Images Captured in Inclement Weather Conditions, 2013 IEEE International Symposium on Multimedia (ISM), Dec. 9-11, 2013, pp. 267-270.

* cited by examiner

METHOD AND IMAGE PROCESSING APPARATUS FOR IMAGE VISIBILITY RESTORATION USING FISHER'S LINEAR DISCRIMINANT BASED DUAL DARK CHANNEL PRIOR

TECHNICAL FIELD

The present invention generally relates to a method and an image processing apparatus for image visibility restoration using a Fisher's Linear Discriminant-based Dual Dark Channel Prior.

BACKGROUND

Visibility of outdoor images is often degraded by turbid medium in poor weather such as haze, fog, sandstorms, and so on. Optically, poor visibility in digital images is due to the substantial presence of different atmospheric particles which absorb and scatter light between a digital camera and a captured object. Image degradation may cause problems for many systems which must operate under a wide range of weather conditions such as outdoor object recognition systems, obstacle detection systems, video surveillance systems, and intelligent transportation systems.

To facilitate the restoration of visibility and the recovery of vivid colors in degraded images, the technique of haze removal has recently emerged as an effective image-restoration tool. It utilizes scene depth information to produce haze-free images for a wide range of computational vision applications. Consequentially, numerous haze removal methods have been proposed.

According to previous research, the conventional haze removal methods may fit into two major categories: single image information and non-single image information.

Non-single image information approaches remove haze by utilizing either multiple images or additional geometrical information for a same scene via special hardware in order to estimate the unknown depth information, thereby removing haze formation and restoring visibility. However, the use of non-single image information approaches often requires additional hardware. This results in added expense and increased technique complexity.

Recently, research conducted in the area of image haze removal has been oriented towards single-image information approaches, by which a single image is used to achieve complete restoration. This is accomplished by employing stronger priors or assumptions when determining the difference between a haze-free image and an incoming hazy image. A prior art method proposes a single-image restoration technique that removes haze by maximizing the local contrast of recovered scene radiance based on an observation that captured hazy images have lower contrast than restored images. However, such technique may result in unwanted feature artifact effects along depth edges. Another prior art method proposes another single-image restoration technique that estimates the albedo of the scene and deduces the transmission map based on an assumption that the transmission shading and the surface shading are locally uncorrelated. However, such technique may not contend with images featuring dense fog.

Yet another prior art proposes a dark channel prior method which uses a key assumption that most local patches for outdoor haze-free images exhibit very low intensity in at least one of color channel, which can be used to directly estimate haze density and recover vivid colors. Until now, such approach has attracted the most attention due to its ability to effectively remove haze formation while only using a single image. Inspired by the dark channel prior technique, an improved haze removal algorithm is proposed by employing a scheme consisting of a dark channel prior and a multi-scale Retinex technique for quickly restoring hazy images. However, the presence of localized light sources and color shifts commonly encountered during inclement weather conditions further complicate the process. As such, the dark channel prior-based methods cannot produce satisfactory restoration results under these circumstances.

SUMMARY OF THE INVENTION

Accordingly, the disclosure is directed to a method and an image processing apparatus for image visibility restoration using Fisher's Linear Discriminant-based Dual Dark Channel Prior (FLD-based DDCP), and the disclosure is able to effectively remove haze from a single image captured in real-world conditions.

The present invention is directed to an image visibility restoration method based on a Fisher's Linear Discriminant-based Dual Dark Channel Prior (FLD-based DDCP), adapted to an image processing apparatus. The method includes the following steps: receiving a plurality of training images corresponding to a plurality of image sizes and a plurality of classes, where each of the classes corresponds to a localized light source; generating a plurality of discriminant patterns from the training images based on a Fisher's Linear Discriminant (FLD) model; receiving an incoming hazy image including a plurality of incoming pixels and classifying each of the incoming pixels as either belonging to a localized light region or a non-localized light region according to intensity values of the incoming pixels; partitioning the localized light region into a plurality of patches according to each patch size in associated with the image sizes; determining whether each of the patches belongs to a localized light patch based on the FLD model corresponding to each of the patch sizes and determining a designated patch size among the patch sizes accordingly; determining a set of adaptable chromatic parameters respectively corresponding to each color channel according to the intensity values of the incoming pixels in each of the color channels; determining dual dark channels respectively corresponding to the designated patch size and a small patch size; determining atmospheric light in each of the color channels according to the dark channel corresponding to the designated patch size and determining a transmission map according to the dark channel corresponding to the small patch size; restoring the incoming hazy image in each of the channels according to according to the corresponding set of adaptive chromatic parameters, the corresponding atmospheric light, and the transmission map so as to produce a de-hazed image; and outputting the de-hazed image.

According to an exemplary embodiment of the disclosure, the step of generating the discriminant patterns from the training images based on the FLD model includes: calculating a between-class scatter matrix and a within-class scatter matrix corresponding to each of the image sizes of the training images; calculating an optimal projection vector corresponding to each of the image sizes of the training images by maximizing a ratio of the corresponding between-class scatter matrix and the corresponding within-class scatter matrix; and obtaining each of the discriminant patterns according to the corresponding optimal projection vector and the corresponding training image.

According to an exemplary embodiment of the disclosure, the formulas for generating the discriminant patterns from the training images based on the FLD model include Eq. (1)-Eq. (4):

$$S_B^f = \sum_{i=1}^{H} n_i(u_i - u)(u_i - u)^T \qquad \text{Eq. (1)}$$

$$S_W^f = \sum_{i=1}^{H} \sum_{x_k \in x_i} (x_k - u_i)(x_k - u_i)^T \qquad \text{Eq. (2)}$$

where $S_B^f$ is the between-class scatter matrix corresponding to the image size f, $S_W^f$ is the within-class scatter matrix corresponding to the image size f, u and $u_i$ represent a mean training image of all the classes and a mean training image of the $i^{th}$ class respectively, $n_i$ represents the number of the training images in the $i^{th}$ class, $x_k$ represents the $k^{th}$ training image in the $i^{th}$ class, H represents the number of all the classes, and H is a positive integer, $$W_{opt}^f = \arg\max_W \frac{|W^T S_B^f W|}{|W^T S_W^f W|} = [w_1, w_2, \ldots, w_r] \qquad \text{Eq. (3)}$$

where $W_{opt}^f$ is the optimal projection vector corresponding to the image size f, $[w_1, w_2, \ldots, w_r]$ represents a set of generalized eigenvectors of $S_B^f$ and $S_W^f$, r is an empirical lower-dimensional value, r is a positive integer and r<H, and $$Z_k^f = (W_{opt}^f)^T x_k \qquad \text{Eq. (4)}$$

where $Z_k^f$ is the discriminant pattern corresponding to the $k^{th}$ training image with the image size f.

According to an exemplary embodiment of the disclosure, the color channels includes a red (R) channel, a green (G) channel, and a blue (B) channel, and the step of classifying each of the incoming pixels as either belonging to the localized light region or the non-localized light region according to the intensity values of the incoming pixels includes: calculating a probability of an occurrence of each of the intensity values of the incoming pixels in the G channel so as to obtain a corresponding pmf evaluation; determining a highest probability value among the pmf evaluations and set the intensity value corresponding to the highest probability value as a binary mask threshold; determining if the intensity value of each of the incoming pixels in the G channel exceeds the binary mask threshold; if yes, classifying the corresponding incoming pixel as belonging to the localized light region; and if no, classifying the corresponding incoming pixel as belonging to the non-localized light region.

According to an exemplary embodiment of the disclosure, the formulas for classifying each of the incoming pixels as either belonging to the localized light region or the non-localized light region according to the intensity values of the incoming pixels include Eq. (5)-Eq. (6):

$$PMF(I^g) = \frac{n_{I^g}}{MN} \qquad \text{Eq. (5)}$$

where $PMF(I^g)$ is the pmf evaluation corresponding to the intensity value g within the G channel of the incoming hazy image I, and MN is the number of incoming pixels, $$B(x, y) = \begin{cases} 1, & \text{if } I(x, y) > \delta \\ 0, & \text{otherwise} \end{cases} \qquad \text{Eq. (6)}$$

where $B(x,y)$ is a binary mask of the incoming pixel at (x,y), and $\delta$ is the binary mask threshold and $$\delta = \max_{0 \leq g \leq 255} PMF(I^g).$$

According to an exemplary embodiment of the disclosure, the steps of determining whether each of the patches belongs to the localized light patch based on the FLD model corresponding to each of the patch sizes and determining the designated patch size among the patch sizes accordingly include: (a) for each of the patch sizes: calculating a projection of each of the patches; determining if a similarity level between each of the projections and the corresponding optimal projection vector exceeds an empirical threshold; if yes, determining that the corresponding patch does not belong to the localized light patch; if no, determining that the corresponding patch belongs to the localized light patch; (b) accumulating the number of the patches belonging to the localized light patch for each of the patch sizes; and assigning the patch size with the maximum number of the patches belong to the localized light patch as the designated patch size.

According to an exemplary embodiment of the disclosure, the formulas for determining whether each of the patches belongs to the localized light patch based on the FLD model corresponding to each of the patch sizes include Eq. (7)-Eq. (8):

$$T_k^f = (W_{opt}^f)^T I_k B_k \qquad \text{Eq. (7)}$$

where $T_k^f$ is the projection of the $k^{th}$ patch in the incoming hazy image with the patch size f, and $I_k$ is the $k^{th}$ patch in the incoming hazy image, $$I_k \in \begin{cases} \text{class1}, & \text{if } \|Z_k^f - T_k^f\| > \Delta \\ \text{class2}, & \text{if } \|Z_k^f - T_k^f\| \leq \Delta \end{cases} \qquad \text{Eq. (8)}$$

According to an exemplary embodiment of the disclosure, the formulas for determining the set of adaptable chromatic parameters respectively corresponding to each of the color channels according to the intensity values of the incoming pixels in each of the color channels include Eq. (9)-Eq. (10):

$$\begin{bmatrix} \frac{1}{MN} \sum_{x=1}^{M} \sum_{y=1}^{N} I^{g^2}(x, y) & \frac{1}{MN} \sum_{x=1}^{M} \sum_{y=1}^{N} I^g(x, y) \\ \max_{0 \leq x \leq M \cap 0 \leq y \leq N} \{I^{g^2}(x, y)\} & \max_{0 \leq x \leq M \cap 0 \leq y \leq N} \{I^g(x, y)\} \end{bmatrix} \qquad \text{Eq. (9)}$$

$$\begin{bmatrix} \mu^r \\ \nu^r \end{bmatrix} = \begin{bmatrix} \frac{1}{MN} \sum_{x=1}^{M} \sum_{y=1}^{N} I^r(x, y) \\ \max_{0 \leq x \leq M \cap 0 \leq y \leq N} \{I^r(x, y)\} \end{bmatrix}$$

-continued $$\begin{bmatrix} \frac{1}{MN}\sum_{x=1}^{M}\sum_{y=1}^{N} I^{b^2}(x,y) & \frac{1}{MN}\sum_{x=1}^{M}\sum_{y=1}^{N} I^{b}(x,y) \\ \max_{0 \le x \le M \cap 0 \le y \le N} \{I^{b^2}(x,y)\} & \max_{0 \le x \le M \cap 0 \le y \le N} \{I^{b}(x,y)\} \end{bmatrix}$$ Eq. (10)

$$\begin{bmatrix} \mu^b \\ v^b \end{bmatrix} = \begin{bmatrix} \frac{1}{MN}\sum_{x=1}^{M}\sum_{y=1}^{N} I^{r}(x,y) \\ \max_{0 \le x \le M \cap 0 \le y \le N} \{I^{r}(x,y)\} \end{bmatrix}$$

where $(\mu^r, v^r)$ and $(\mu^b, v^b)$ are the sets of adaptive chromatic parameters corresponding to the R channel and the B channel.

According to an exemplary embodiment of the disclosure, the formulas for determining the dual dark channels respectively corresponding to the designated patch size and the small patch size include Eq. (11)-Eq. (12):

$$I_\tau^{dark}(x,y) = \min_{(i,j) \in \tau(x,y)} \left( \min_{c \in (r,g,b)} I^c(x,y) \right)$$ Eq. (11)

$$I_\omega^{dark}(x,y) = \min_{(i,j) \in \omega(x,y)} \left( \min_{c \in (r,g,b)} I^c(x,y) \right)$$ Eq. (12)

where $I_\tau^{dark}$ and $I_\omega^{dark}$ represents the dual dark channels corresponding to the designated patch size $\omega$ and the small patch size $\tau$, and $I^c(x,y)$ represents the incoming pixel at (x,y) in the color channel c.

According to an exemplary embodiment of the disclosure, the formulas for restoring the input hazy image in each of the channels according to according to the corresponding set of adaptive chromatic parameters, the corresponding atmospheric light, and the transmission map so as to produce the de-hazed image include Eq. (13)-Eq. (14):

$$t(x,y) = 1 - \omega I_\tau^{dark}(x,y)$$ Eq. (13)

where t(x,y) is the transmission map, and $\omega$ is a constant parameter ranging between 0 and 1, $$J^c(x,y) =$$ Eq. (14)

$$\frac{\mu^c(I^{c^2}(x,y) - A^{c^2}) + v^c(I^c(x,y) - A^c)}{\max(t(x,y), t_0)} + (\mu^c A^{c^2} + v^c A^c)$$

where $J^c$ represents de-hazed image in the color channel c, $I^c(x,y)$ represents the incoming hazy image, $A^c$ represents the atmospheric light in the color channel c, and $t_0$ is a lower transmission bound.

The disclosure is directed to an image processing apparatus including a storage unit and a processing unit, where the processing unit is coupled to the storage unit. The storage unit is configured to record a plurality of modules. The processing unit is configured to access and execute the modules recorded in the storage unit, where the modules include an image receiving module, a localized light detection module, an adaptable parameter generation module, an image recovery module, an image output module. The image receiving module receives a plurality of training images corresponding to a plurality of image sizes and a plurality of classes and receives an incoming hazy image including a plurality of incoming pixels, where each of the classes corresponds to a localized light source. The localized light detection module generates a plurality of discriminant patterns from the training images based on a Fisher's Linear Discriminant (FLD) model, classifies each of the incoming pixels as either belonging to a localized light region or a non-localized light region according to intensity values of the incoming pixels, partitions the localized light region into a plurality of patches according to each patch size in associated with the image sizes, determines whether each of the patches belongs to a localized light patch based on the FLD model corresponding to each of the patch sizes, and determines a designated patch size among the patch sizes accordingly. The adaptable parameter generation module determines a set of adaptable chromatic parameters respectively corresponding to each color channel according to the intensity values of the incoming pixels in each of the color channels. The image recovery module determines dual dark channels respectively corresponding to the designated patch size and a small patch size, determines atmospheric light in each of the color channels according to the dark channel corresponding to the designated patch size and determining a transmission map according to the dark channel corresponding to the small patch size, and restores the incoming hazy image in each of the channels according to according to the corresponding set of adaptive chromatic parameters, the corresponding atmospheric light, and the transmission map so as to produce a de-hazed image. The image output module, outputting the de-hazed image.

According to an exemplary embodiment of the disclosure, the localized light detection module calculates a between-class scatter matrix and a within-class scatter matrix corresponding to each of the image sizes of the training images, calculates an optimal projection vector corresponding to each of the image sizes of the training images by maximizing a ratio of the corresponding between-class scatter matrix and the corresponding within-class scatter matrix, and obtains each of the discriminant patterns according to the corresponding optimal projection vector and the corresponding training image.

According to an exemplary embodiment of the disclosure, the localized light detection module generates the discriminant patterns from the training images based on the FLD model according to Eq. (1)-Eq. (4):

$$S_B^f = \sum_{i=1}^{H} n_i(u_i - u)(u_i - u)^T$$ Eq. (1)

$$S_W^f = \sum_{i=1}^{H} \sum_{x_k \in x_i} (x_k - u_i)(x_k - u_i)^T$$ Eq. (2)

where $S_B^f$ is the between-class scatter matrix corresponding to the image size f, $S_W^f$ is the within-class scatter matrix corresponding to the image size f, u and $u_i$ represent a mean training image of all the classes and a mean training image of the $i^{th}$ class respectively, $n_i$ represents the number of the training images in the $i^{th}$ class, $x_k$ represents the $k^{th}$ training image in the $i^{th}$ class, H represents the number of all the classes, and H is a positive integer, $$W_{opt}^f = \arg\max_W \frac{|W^T S_B^f W|}{|W^T S_W^f W|} = [w_1, w_2, \ldots, w_r]$$ Eq. (3)

where $W_{opt}^f$ is the optimal projection vector corresponding to the image size f, $[w_1, w_2, \ldots, w_r]$ represents a set of generalized eigenvectors of $S_B^f$ and $S_W^f$, r is an empirical lower-dimensional value, r is a positive integer and r<H, and $$Z_k^f = (W_{opt}^f)^T x_k \qquad \text{Eq. (4)}$$

where $Z_k^f$ is the discriminant pattern corresponding to the $k^{th}$ training image with the image size.

According to an exemplary embodiment of the disclosure, the localized light detection module calculates a probability of an occurrence of each of the intensity values of the incoming pixels in the G channel so as to obtain a corresponding pmf evaluation, determines a highest probability value among the pmf evaluations and set the intensity value corresponding to the highest probability value as a binary mask threshold, and determining if the intensity value of each of the incoming pixels in the G channel exceeds the binary mask threshold. If yes, the localized light detection module classifies the corresponding incoming pixel as belonging to the localized light region. If no, the localized light detection module classifies the corresponding incoming pixel as belonging to the non-localized light region.

According to an exemplary embodiment of the disclosure, the localized light detection module classifies each of the incoming pixels as either belonging to the localized light region or the non-localized light region according to the intensity values of the incoming pixels based on Eq. (5)-Eq. (6):

$$PMF(I^g) = \frac{n_{I^g}}{MN} \qquad \text{Eq. (5)}$$

where $PMF(I^g)$ is the pmf evaluation corresponding to the intensity value g within the G channel of the incoming hazy image I, and MN is the number of incoming pixels, $$B(x, y) = \begin{cases} 1, & \text{if } I(x, y) > \delta \\ 0, & \text{otherwise} \end{cases} \qquad \text{Eq. (6)}$$

where B(x,y) is a binary mask of the incoming pixel at (x,y), and δ is the binary mask threshold and $$\delta = \max_{0 \leq g \leq 255} PMF(I^g).$$

According to an exemplary embodiment of the disclosure, for each of the patch sizes: the localized light detection module calculates a projection of each of the patches and determines if a similarity level between each of the projections and the corresponding optimal projection vector exceeds an empirical threshold; if yes, the localized light detection module determines that the corresponding patch does not belong to the localized light patch; if no, the localized light detection module determines that the corresponding patch belongs to the localized light patch. The localized light detection module accumulates the number of the patches belonging to the localized light patch for each of the patch sizes and assigns the patch size with the maximum number of the patches belong to the localized light patch as the designated patch size.

According to an exemplary embodiment of the disclosure, the localized light detection module determines whether each of the patches belongs to the localized light patch based on the FLD model corresponding to each of the patch sizes based on Eq. (7)-Eq. (8):

$$T_k^f = (W_{opt}^f)^T I_k B_k \qquad \text{Eq. (7)}$$

where $T_k^f$ is the projection of the $k^{th}$ patch in the incoming hazy image with the patch size f, and $I_k$ is the $k^{th}$ patch in the incoming hazy image, $$I_k \in \begin{cases} \text{class1,} & \text{if } \|Z_k^f - T_k^f\| > \Delta \\ \text{class2,} & \text{if } \|Z_k^f - T_k^f\| \leq \Delta \end{cases} \qquad \text{Eq. (8)}$$

According to an exemplary embodiment of the disclosure, the adaptable parameter generation module determines the set of adaptable chromatic parameters respectively corresponding to each of the color channels according to the intensity values of the incoming pixels in each of the color channels based on Eq. (9)-Eq. (10):

$$\begin{bmatrix} \frac{1}{MN} \sum_{x=1}^{M} \sum_{y=1}^{N} I^{g^2}(x, y) & \frac{1}{MN} \sum_{x=1}^{M} \sum_{y=1}^{N} I^g(x, y) \\ \max_{0 \leq x \leq M \cap 0 \leq y \leq N} \{I^{g^2}(x, y)\} & \max_{0 \leq x \leq M \cap 0 \leq y \leq N} \{I^g(x, y)\} \end{bmatrix} \qquad \text{Eq. (9)}$$

$$\begin{bmatrix} \mu^r \\ \nu^r \end{bmatrix} = \begin{bmatrix} \frac{1}{MN} \sum_{x=1}^{M} \sum_{y=1}^{N} I^r(x, y) \\ \max_{0 \leq x \leq M \cap 0 \leq y \leq N} \{I^r(x, y)\} \end{bmatrix}$$

$$\begin{bmatrix} \frac{1}{MN} \sum_{x=1}^{M} \sum_{y=1}^{N} I^{b^2}(x, y) & \frac{1}{MN} \sum_{x=1}^{M} \sum_{y=1}^{N} I^b(x, y) \\ \max_{0 \leq x \leq M \cap 0 \leq y \leq N} \{I^{b^2}(x, y)\} & \max_{0 \leq x \leq M \cap 0 \leq y \leq N} \{I^b(x, y)\} \end{bmatrix} \qquad \text{Eq. (10)}$$

$$\begin{bmatrix} \mu^b \\ \nu^b \end{bmatrix} = \begin{bmatrix} \frac{1}{MN} \sum_{x=1}^{M} \sum_{y=1}^{N} I^r(x, y) \\ \max_{0 \leq x \leq M \cap 0 \leq y \leq N} \{I^r(x, y)\} \end{bmatrix}$$

where ($\mu^r$, $\nu^r$) and ($\mu^b$, $\nu^b$) are the sets of adaptive chromatic parameters corresponding to the R channel and the B channel.

According to an exemplary embodiment of the disclosure, the image recovery module determines the dual dark channels respectively corresponding to the designated patch size and the small patch size based on Eq. (11)-Eq. (12):

$$I_\tau^{dark}(x, y) = \min_{(i,j) \in \tau(x,y)} \left( \min_{c \in (r,g,b)} I^c(x, y) \right) \qquad \text{Eq. (11)}$$

$$I_\omega^{dark}(x, y) = \min_{(i,j) \in \omega(x,y)} \left( \min_{c \in (r,g,b)} I^c(x, y) \right) \qquad \text{Eq. (12)}$$

where $I_\tau^{dark}$ and $I_\omega^{dark}$ represents the dual dark channels corresponding to the designated patch size ω and the small patch size τ, and $I^c(x,y)$ represents the incoming pixel at (x,y) in the color channel c.

According to an exemplary embodiment of the disclosure, the image recovery module restores the input hazy image in each of the channels according to according to the corresponding set of adaptive chromatic parameters, the corresponding atmospheric light, and the transmission map so as to produce the de-hazed image based on Eq. (13)-Eq. (14):

$$t(x,y) = 1 - \omega I_\tau^{dark}(x,y) \qquad \text{Eq. (13)}$$

where t(x,y) is the transmission map, and ω is a constant parameter ranging between 0 and 1, $$J^c(x, y) = \frac{\mu^c(I^{c^2}(x, y) - A^{c^2}) + \nu^c(I^c(x, y) - A^c)}{\max(t(x, y), t_0)} + (\mu^c A^{c^2} + \nu^c A^c) \quad \text{Eq. (14)}$$

where $J^c$ represents de-hazed image in the color channel c, $I^c(x,y)$ represents the incoming hazy image, $A^c$ represents the atmospheric light in the color channel c, and $t_0$ is a lower transmission bound.

In view of the aforementioned descriptions, based on a FLD-based DDCP scheme via the conjunctive utilization of localized light detection, adaptable parameter generation, and image recovery, the disclosure is able to solve the problems associated with the presence of localized light sources and color shifts, and thereby achieve effective image restoration.

In order to make the aforementioned features and advantages of the disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

Figure 1:
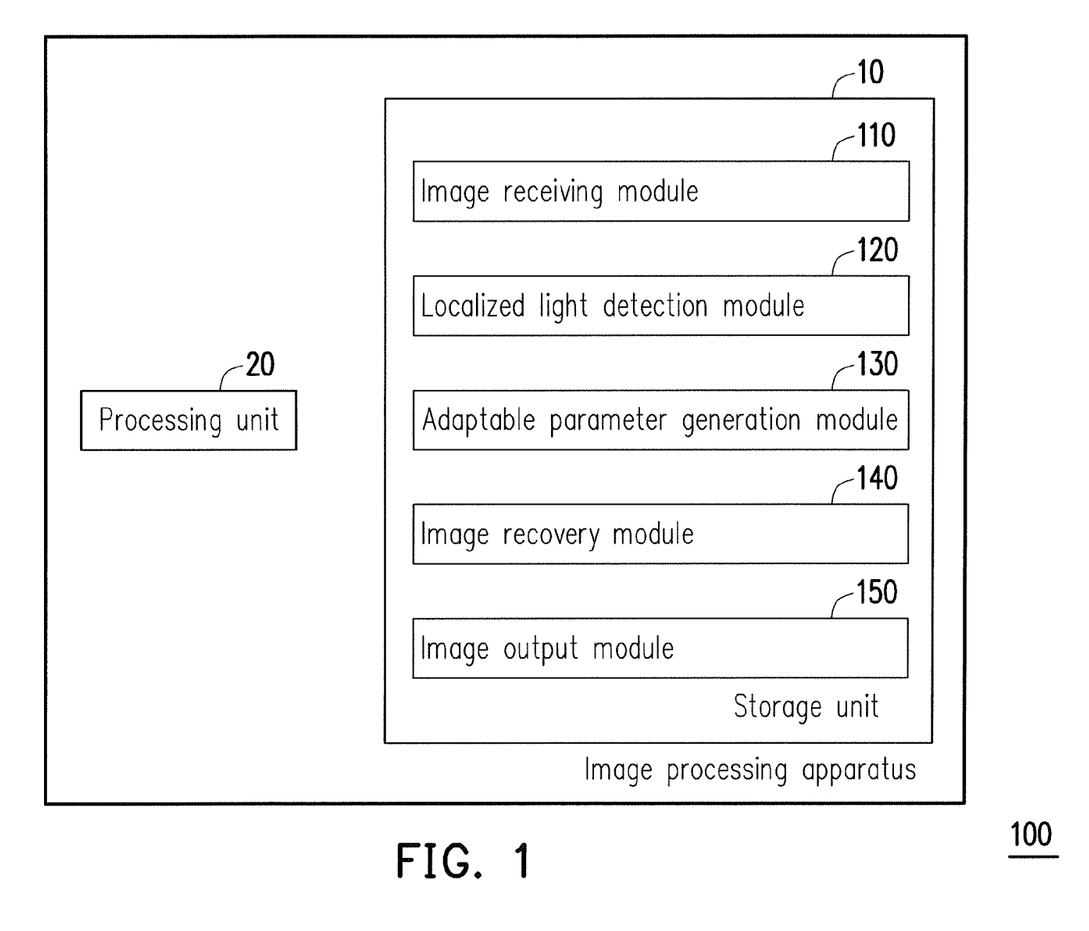
FIG. 1 illustrates an exemplary image processing apparatus which utilizes the proposed image visibility restoration method from the hardware perspective in accordance with one of the exemplary embodiments of the disclosure.

FIG. 1 illustrates an exemplary image processing apparatus which utilizes the proposed image visibility restoration method from the hardware perspective in accordance with one of the exemplary embodiments of the disclosure. Referring to FIG. 1, an image processing apparatus 100 may include a storage unit 10 and a processing unit 20, where the processing unit 20 is coupled to the storage unit 10.

The image processing apparatus 100 may be an electronic device such as a personal computer, a laptop computer, a digital camera, a digital camcorder, a web camera, a smart phone, a tabular computer, an event data recorder, a vehicle audio and video system, and so forth.

The storage unit 10 may be one or a combination of a stationary or mobile random access memory (RAM), a read-only memory (ROM), a flash memory, a hard drive or other similar devices. The storage unit 10 is configured to record a plurality of modules executable by the processing unit 20. The modules include an image receiving module 110, a localized light detection module 120, an adaptable parameter generation module 130, an image recovery module 140, and an image output module 150. The modules may be loaded into the processing unit 20 for visibility restoration from a digital image.

The processing unit 20 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of aforementioned devices. The processing unit 20 is capable of accessing and executing the modules recorded in the storage unit 10 and would be used to perform the visibility restoration method as proposed.

Figure 2:
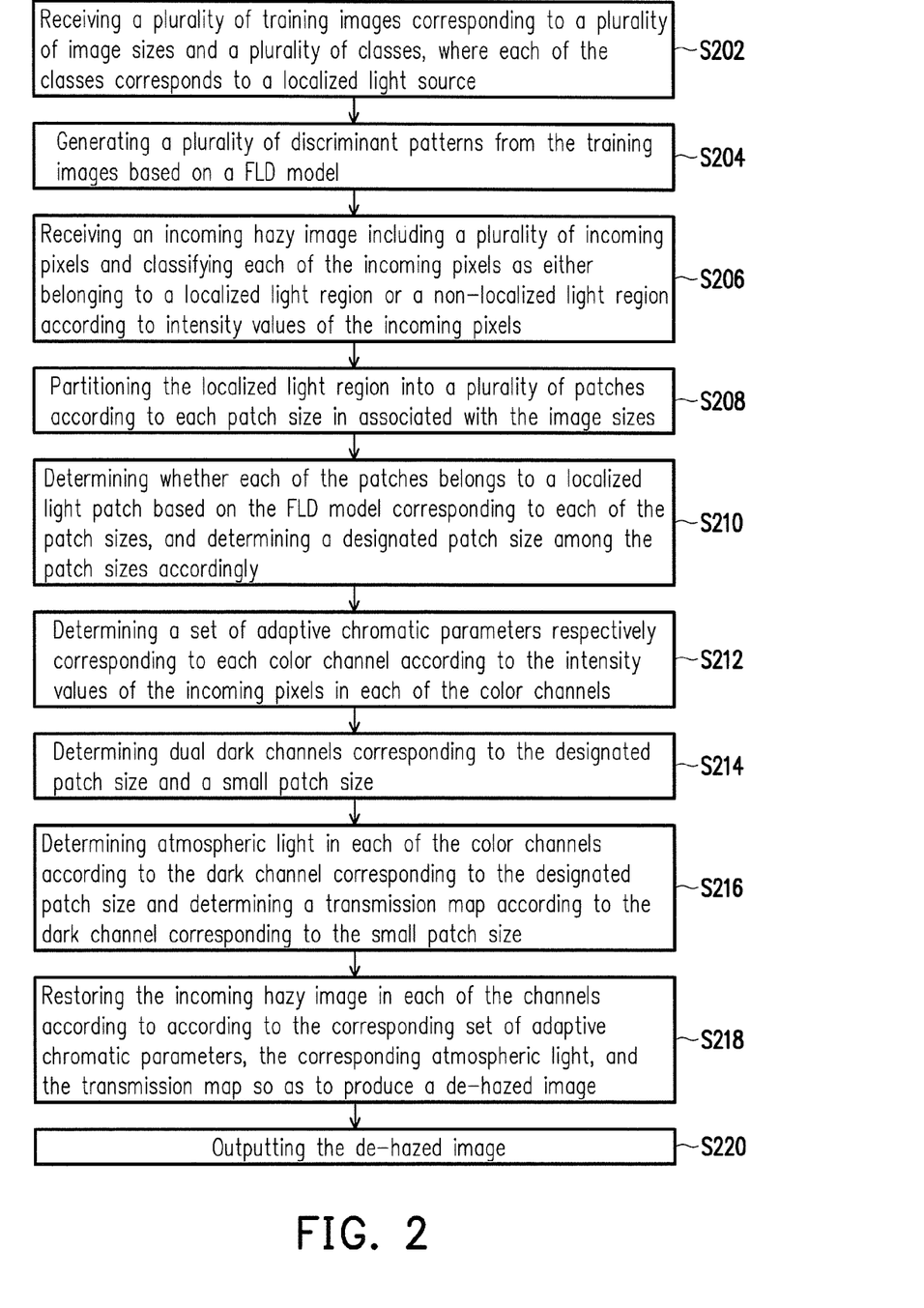
FIG. 2 illustrates a flowchart of an image visibility restoration method in accordance with one of the exemplary embodiments of the disclosure.

FIG. 2 illustrates a flowchart of an image visibility restoration method in accordance with one of the exemplary embodiments of the disclosure. The proposed method is based on a Fisher's Linear Discriminant-based Dual Dark Channel Prior (FLD-based DDCP) scheme. It may solve the problem in associated with the presence of localized light sources and color shifts and thereby achieve effective image visibility restoration. In the present embodiment, the proposed method may be performed by the image processing apparatus 100 of FIG. 1.

Referring to both FIG. 1 and FIG. 2, the image receiving module 110 receives a plurality of training images corresponding to a plurality of image sizes and a plurality of classes, where each of the classes corresponds to a localized light source (Step S202). Next, the localized light detection module 120 generates a plurality of discriminant patterns from the training images based on a Fisher's Linear Discriminant (FLD) model (Step S204). In other words, in order to detect localized light sources in a hazy image, it is necessary to produce lower-dimensional discriminant patterns by using optimal projection vectors via the FLD technique in a training stage. Initially, the image receiving module 110 may receive different types of differently-sized training images with varied localized light sources. In the present exemplary embodiment, the training images are images with light patterns in sizes of 15×15, 33×33, and 51×51, and localized light sources may be vehicle headlight and street light. Various image sizes with the $k^{th}$ image x belonging to the $i^{th}$ class in a training set is presented herein. The optimal projection vectors may be obtained through a procedure in which the ratio of a between-class scatter matrix and a within-class scatter matrix is maximized.

To be specific, the localized light detection module 120 may calculate a between-class scatter matrix and a within-class scatter matrix corresponding to each of the image sizes of the training images, and then calculate an optimal projection vector corresponding to each of the image sizes of the training images by maximizing the ratio of the corresponding between-class scatter matrix and the corresponding within-class scatter matrix. The localized light detection module 120 may then obtain each of the discriminant patterns according to the corresponding optimal projection vector and the corresponding training image.

In an embodiment, the localized light detection module 120 may generate the discriminant patterns according to Eq. (1)-Eq. (4):

$$S_B^f = \sum_{i=1}^{H} n_i(u_i - u)(u_i - u)^T \qquad \text{Eq. (1)}$$

$$S_W^f = \sum_{i=1}^{H} \sum_{x_k \in x_i} (x_k - u_i)(x_k - u_i)^T \qquad \text{Eq. (2)}$$

where $S_B^f$ is the between-class scatter matrix corresponding to the image size f, $S_W^f$ is the within-class scatter matrix corresponding to the image size f, u and $u_i$ represent a mean training image of all the classes and a mean training image of the $i^{th}$ class respectively, $n_i$ represents the number of the training images in the $i^{th}$ class, $x_k$ represents the $k^{th}$ image in the $i^{th}$ class, H represents the number of all the classes, and H is a positive integer, $$W_{opt}^f = \arg\max_W \frac{|W^T S_B^f W|}{|W^T S_W^f W|} = [w_1, w_2, \cdots, w_r] \qquad \text{Eq. (3)}$$

where $W_{opt}^f$ is the optimal projection vector corresponding to the image size f, $[w_1, w_2, \ldots, w_r]$ represents a set of generalized eigenvectors of $S_B^f$ and $S_W^f$, r is an empirical lower-dimensional value, r is a positive integer and r<H, and $$Z_k^f = (W_{opt}^f)^T x_k \qquad \text{Eq. (4)}$$

where $Z_k^f$ is the discriminant pattern corresponding to the $k^{th}$ training image with the image size f.

In terms of the conventional dark channel prior method, localized light sources would cause over-saturation effects in restored images. This is because the dark channel prior method may easily misjudge localized lights as atmospheric light. To accelerate the detection of any localized light sources in an image, a probability mass function (PMF) evaluation is adopted for the image to eliminate non-localized light regions. That is, the localized light detection module 120 receives an incoming hazy image including a plurality of incoming pixels and classifies each of the incoming pixels as either belonging to a localized light region or a non-localized light region according to intensity values of the incoming pixels (Step S206). The present embodiment, the incoming hazy image is built in an RGB color space via three color channels, where the three color channels are red (R), green (G), and blue (B).

Figure 3:
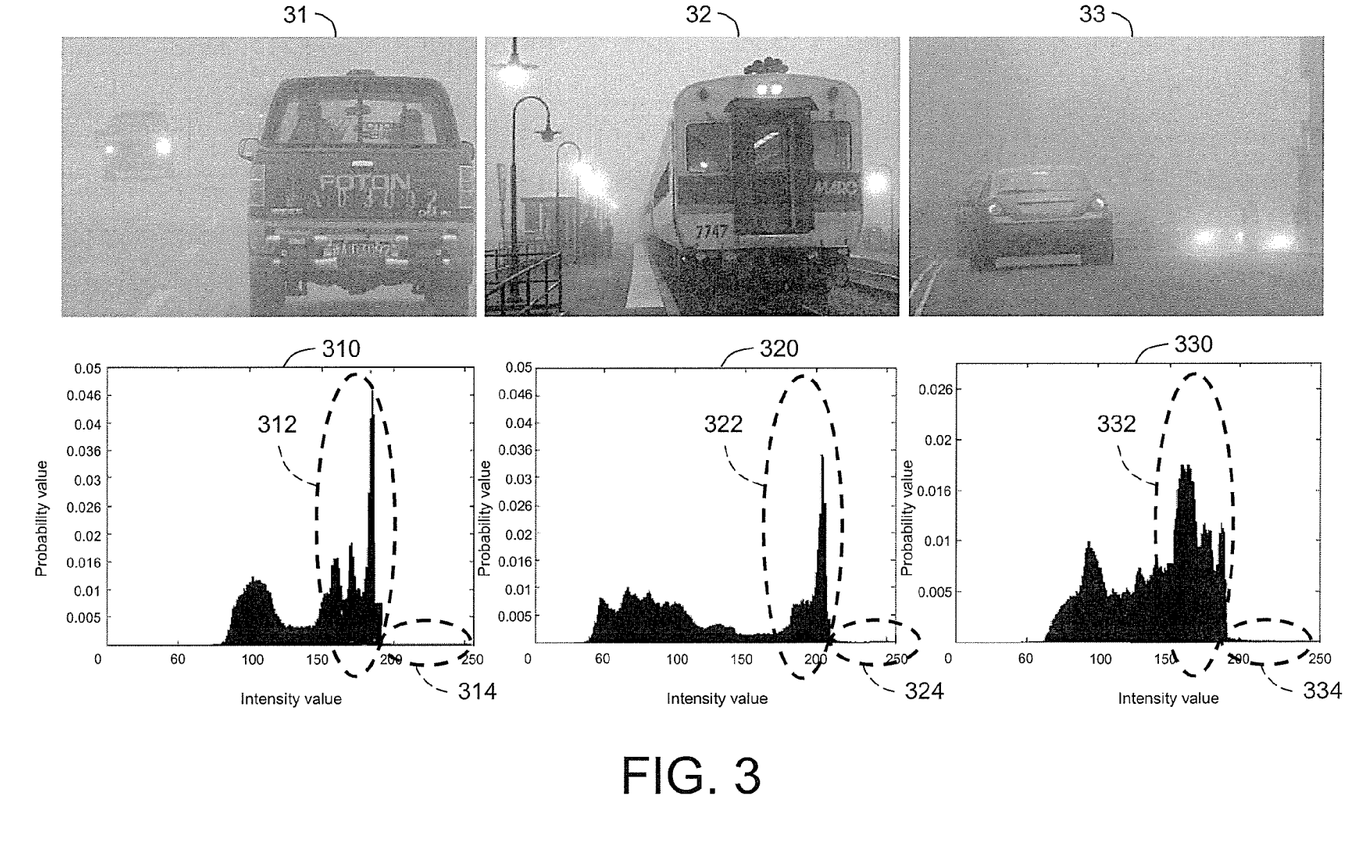
FIG. 3 illustrates examples of probability value variations of different incoming hazy images in accordance with one of the exemplary embodiments of the disclosure.

In general, there are two phenomena associated with the misjudged atmospheric light, and they are as follows: 1) Localized light sources are brighter than most sky regions in hazy images. 2) Large amounts of bright pixels are present in the sky regions of natural outdoor images. For example, FIG. 3 illustrates examples of pmf diagrams 310-330 of different incoming hazy images 31-33, where each of the pmf diagrams 310-330 represents probability value variations against intensity values of the incoming hazy images 31-33. Sky regions 312, 322, 332 and localized light sources 314, 324, 334 are outlined on the pmf diagrams 310-330. Thus, it is natural to expect that the highest probability value segregates the non-localized light regions to the left side in the pmf diagram.

The localized light detection module 120 may calculate a probability of an occurrence of each of the intensity values of the incoming pixels within the G channel in the incoming hazy image so as to obtain a corresponding pmf evaluation. Next, the localized light detection module 120 may determine a highest probability value among the pmf evaluations and set the intensity value corresponding to the highest probability value as a binary mask threshold. The localized light detection module 120 may then determine if the intensity value of each of the incoming pixels exceeds the binary mask threshold. If yes, the corresponding incoming pixel would be classified as the localized light region; if no, the corresponding incoming pixel would be classified as the non-localized light region.

In an embodiment, the localized light detection module 120 may classify each of the incoming pixels as either belonging to the localized light region or the non-localized light region according to Eq. (5)-Eq. (6):

$$PMF(I^g) = \frac{n_{I^g}}{MN} \qquad \text{Eq. (5)}$$

where $PMF(I^g)$ is the pmf evaluation corresponding to the intensity value g within the G channel of the incoming hazy image I, and MN is the number of incoming pixels, $$B(x, y) = \begin{cases} 1, & \text{if } I(x, y) > \delta \\ 0, & \text{otherwise} \end{cases} \qquad \text{Eq. (6)}$$

where B(x,y) is a binary mask of the incoming pixel at (x,y), and δ is the binary mask threshold, which is the intensity value with the pmf evaluation $$\max_{0 \leq g \leq 255} PMF(I^g).$$

This means that the binary mask B(x,y) is labeled as '1' to denote that it belongs to the localized light region, and the binary mask B(x,y) is labeled as '0' to denote that it belongs to the non-localized region.

After elimination of the non-localize light region of the incoming hazy image, localized light sources may be accurately detected via the FLD technique. That is, the localized light sources may be detected by using the lower-dimensional discriminant patterns within only those regions of the incoming hazy image which are regarded as having a high probability of containing localized lights. A patch size may be determined after the size of localized light sources is detected via the FLD technique, and the localized lights are concealed in a follow-up step to further avoid over-saturation of the restored image.

To achieve this, the localized light detection module 120 first partitions the localized light region into a plurality of patches according to each patch size in associated with the image sizes (Step S208), determines whether each of the patches belongs to a localized light patch based on the FLD model corresponding to each of the patch sizes, and determines a designated patch size among the patch sizes accordingly (Step S210). To be specific, in order to detect localized light sources in the incoming hazy image, the localized light detection module 120 may first calculate a projection of each of the patches after the localized light region is partitioned with a specific patch size in associated with one of the image sizes of the training images, for example, 15×15. Next, the localized light detection module 120 may determine if a similarity level between each of the projections and the corresponding optimal projection vector exceeds an empirical threshold. If yes, the localized light detection module 120 may determine that the corresponding patch does not belong to the localized light patch; if no, the localized light detection module 120 may determine that the corresponding patch belongs to the localized patch. Similarly the localized light detection module 120 may perform the same procedure for other patch sizes in associated with the other image sizes such as 33×33 and. Next, the localized light detection module 120 may accumulate the number of the patches belonging to the localized light patch for each of the patch sizes and assign the patch size with the maximum number of the patches belonging to the localized light patch as the designated patch size.

In an exemplary embodiment, the localized light detection module 120 may determine whether each of the patches belongs to the localized light patch according to Eq. (7)-Eq. (8):

$$T_k^f = (W_{opt}^f)^T I_k B_k \quad \text{Eq. (7)}$$

where $T_k^f$ is the projection of the $k^{th}$ patch in the incoming hazy image with the patch size f, and $I_k$ is the $k^{th}$ patch in the incoming hazy image, $$I_k \in \begin{cases} \text{class1}, & \text{if } \|Z_k^f - T_k^f\| > \Delta \\ \text{class2}, & \text{if } \|Z_k^f - T_k^f\| \leq \Delta \end{cases} \quad \text{Eq. (8)}$$

This means that the patch $I_k$ is labeled as 'class1' to denote that it does not belongs to the localized light patch, and the patch $I_k$ is labeled as 'class2' to denote that it belongs to the localized light patch. The localized light detection module 120 would set the patch size which fit most often to 'class2' as the designated patch size.

Steps S206, S208, and S210 may be referred to as "a localized light detection stage" of an incoming hazy image. After the localized light detection stage is completed, in order to avoid color shifts, the adaptable parameter generation module 130 determines a set of adaptable chromatic parameters respectively corresponding to each color channel according to the intensity values of the incoming pixels (Step S212, referred to as "an adaptable parameter generation stage"). A hybrid spectrum analysis technique which is based on a combination of the gray world assumption and Retinex theory is applied to generate the chromatic adaptable parameters.

The gray world assumption uses the observation that mean values of each RGB color channel in an image may tend towards a common gray value when the image contains a sufficient number of color variations. Moreover, due to a stronger similarity of the mean values of the G channel to the common gray value than to the other two color channels, the values of the G channel may be reserved and the values of the R and B channels may be scaled via Von Kries transformation by using the chromatic adaptable parameters of the gray world assumption. The chromatic adaptable parameters in the gray world assumption may be measured as follows:

$$\alpha = \frac{\frac{1}{MN}\sum_{x=1}^{M}\sum_{y=1}^{N}I^g(x,y)}{\frac{1}{MN}\sum_{x=1}^{M}\sum_{y=1}^{N}I^r(x,y)}$$

$$\beta = \frac{\frac{1}{MN}\sum_{x=1}^{M}\sum_{y=1}^{N}I^g(x,y)}{\frac{1}{MN}\sum_{x=1}^{M}\sum_{y=1}^{N}I^b(x,y)}$$

where $\alpha$ and $\beta$ represent gain coefficients for modifying the R and B channels over the RGC color space in the image respectively, and $I^r(x,y)$, $I^g(x,y)$, and $I^b(x,y)$ represent the intensity values in R, G, B color channels of the image I at (x,y) respectively.

Furthermore, according to psychovisual studies, the Retinex theory states that perceived white is associated with the maximum cone signals of the human visual system. The chromatic adaptable parameters in the Retinex theory are measured via the maximum values of each of the color channels. Thus, in addition to the gray world assumption, the intensity values of the G channel are retained and the values of the R and B channels are scaled via the chromatic adaptable parameters of the Retinex theory. The chromatic adaptable parameters in the Retinex theory may be measured as follows:

$$\alpha = \frac{\max_{0 \leq x \leq M \cap 0 \leq y \leq N}\{I^g(x,y)\}}{\max_{0 \leq x \leq M \cap 0 \leq y \leq N}\{I^r(x,y)\}}$$

$$\beta = \frac{\max_{0 \leq x \leq M \cap 0 \leq y \leq N}\{I^g(x,y)\}}{\max_{0 \leq x \leq M \cap 0 \leq y \leq N}\{I^b(x,y)\}}$$

The gray world assumption tends to work well for images which contain a sufficient number of color variations, whereas the Retinex theory tends to work well for those with a small number of color variations. The advantages of each are used to generate the chromatic adaptable parameters for avoiding the effects of color shifts caused by sandstorm weather conditions. Thus, the adaptable parameter generation module 130 may employ two additional adaptable chromatic parameters by using a hybrid spectrum analysis technique via a combination of the gray world assumption and Retinex theory to ensure significant avoidance of color-shift effects. The adaptable parameter generation module 130 may obtain the chromatic adaptable parameters $(\mu^r, \nu^r)$ and $(\mu^b, \nu^b)$ of the hybrid spectrum analysis technique with a quadratic mapping of intensities in the G and B color channels according to Eq. (9)-Eq. (10):

$$\begin{bmatrix} \frac{1}{MN}\sum_{x=1}^{M}\sum_{y=1}^{N} I^{g^2}(x,y) & \frac{1}{MN}\sum_{x=1}^{M}\sum_{y=1}^{N} I^{g}(x,y) \\ \max_{0\le x\le M \cap 0\le y\le N}\{I^{g^2}(x,y)\} & \max_{0\le x\le M \cap 0\le y\le N}\{I^{g^2}(x,y)\} \end{bmatrix}$$
$$\begin{bmatrix} \mu^r \\ v^r \end{bmatrix} = \begin{bmatrix} \frac{1}{MN}\sum_{x=1}^{M}\sum_{y=1}^{N} I^{r}(x,y) \\ \max_{0\le x\le M \cap 0\le y\le N}\{I^{r}(x,y)\} \end{bmatrix}$$

$$\begin{bmatrix} \frac{1}{MN}\sum_{x=1}^{M}\sum_{y=1}^{N} I^{b^2}(x,y) & \frac{1}{MN}\sum_{x=1}^{M}\sum_{y=1}^{N} I^{b}(x,y) \\ \max_{0\le x\le M \cap 0\le y\le N}\{I^{b^2}(x,y)\} & \max_{0\le x\le M \cap 0\le y\le N}\{I^{b}(x,y)\} \end{bmatrix} \quad \text{Eq. (10)}$$
$$\begin{bmatrix} \mu^b \\ v^b \end{bmatrix} = \begin{bmatrix} \frac{1}{MN}\sum_{x=1}^{M}\sum_{y=1}^{N} I^{r}(x,y) \\ \max_{0\le x\le M \cap 0\le y\le N}\{I^{r}(x,y)\} \end{bmatrix}$$

Once the localized light detection module 120 has determined the patch size during the localized light detection stage, and the adaptable parameter generation module 130 has generated the chromatic adaptable parameters during the adaptable parameter generation stage, the image recovery module 140 may then produce a restored image which contains neither over-saturation nor color-shift effects. This is accomplished by a dual dark channel prior procedure and an image dehazing procedure.

To be specific, in the dual dark channel prior procedure, the image recovery module 140 determines dual dark channels corresponding to the designated patch size and a small patch size (Step S214). The designated patch size, which is determined via in the aforementioned localized light determination stage, is used for producing the dark channel in the incoming hazy image in order to conceal the localized lights and subsequently avoid the effects of over-saturation in the restored image. Thus, the dark channel of variable patch size may achieve effective concealment of the localized lights, whereupon it may also estimate the position of atmospheric light.

Unfortunately, in the conventional dark channel prior technique, the patch size is assumed to be constant in a transmission map, and halo artefacts may be generated in the restored image. In order to avoid such block effects, a transmission map in the proposed method is established by utilizing a patch with the smallest size, for example, 3×3. Moreover, due to the generation of the transmission map via the use of the smallest patch size, the properties of object representation may be effectively maintained. Therefore, it is unnecessary to use the soft matting technique applied in the conventional dark channel prior technique.

Thus, the image recovery module 140 may determine the dual dark channels according to Eq. (11)-Eq. (12):

$$I_\tau^{dark}(x,y) = \min_{(i,j)\in\tau(x,y)}\left(\min_{c\in(r,g,b)} I^c(x,y)\right) \quad \text{Eq. (11)}$$

$$I_\omega^{dark}(x,y) = \min_{(i,j)\in\omega(x,y)}\left(\min_{c\in(r,g,b)} I^c(x,y)\right) \quad \text{Eq. (12)}$$

where $I_\tau^{dark}$ and $I_\omega^{dark}$ represents the dual dark channels corresponding to the designated patch size ω and the small patch size τ, and $I^c$y) represents the incoming pixel at (x,y) in the color channel c.

Next, the image recovery module 140 determines atmospheric light in each of the color channels according to the dark channel corresponding to the designated patch size and determines a transmission map according to the dark channel corresponding to the small patch size (Step S216). In the present exemplary embodiment, the highest intensity value in each of the color channels of the incoming hazy image may be picked up individually within the corresponding brightest 0.1% of the incoming pixels in the dark channel $I_\omega^{dark}$ produced by using the designated patch size to determine the position of the atmospheric light. This is because the dark channel of the designated patch size may conceal the localized light sources to further circumvent over-situation in the restored image. In addition, the transmission map via the small patch size $I_\tau^{dark}$ may be established according to Eq. (13):

$$t(x,y)=1-\omega I_\tau^{dark}(x,y) \quad \text{Eq. (13)}$$

where t is the transmission map, and ω is a constant parameter ranging between 0 and 1. In the present embodiment, ω may be empirically set to 0.95.

In the image dehazing procedure, the image recovery module 140 restores the incoming hazy image in each of the channels according to according to the corresponding set of adaptive chromatic parameters, the corresponding atmospheric light, and the transmission map so as to produce a de-hazed image (Step S218). To be specific, since the incoming hazy image captured in, for example, sandstorms may feature color shifts towards an opaque yellow, orange, or even brown hue, the image recovery module 140 may apply the chromatic adaptable parameters to ensure elimination of color-shift effects in the restored image.

In an exemplary embodiment, the image recovery module 140 may restoring the incoming hazy image in each of the channels according to Eq. (14):

$$J^c(x,y) = \frac{\mu^c(I^{c^2}(x,y)-A^{c^2})+v^c(I^c(x,y)-A^c)}{\max(t(x,y),t_0)} + (\mu^c A^{c^2}+v^c A^c) \quad \text{Eq. (14)}$$

where c∈{r, g, b}, $J^c$ represents de-hazed image in the color channel c, $I^c(x,y)$ represents the incoming hazy image, $A^c$ represents the atmospheric light in the color channel c, and $t_0$ is a lower transmission bound. In an exemplary embodiment, $t_0$ may be set to 0.1. It is noted that, $\mu^c$ and $v^c$ are set as defined by Eq. (9) and Eq. (10) in the G and B channels, and they may be experimentally set to 1 in the R channel.

After the image recovery module 140 produces the de-hazed image, the image output module 150 outputs the de-hazed image (Step S220), where the output image does not contain unwanted artifacts.

Figure 4:
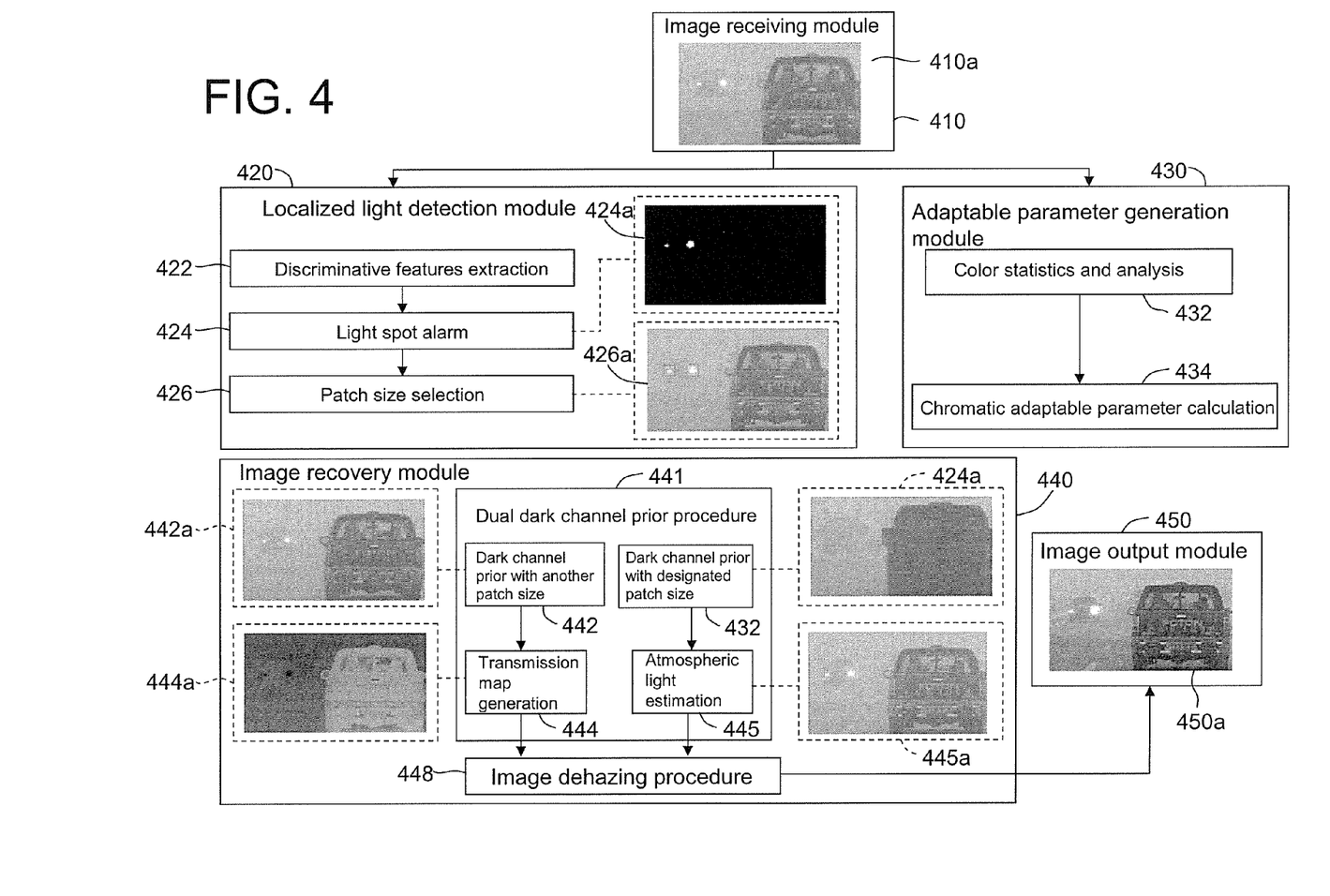
FIG. 4 illustrates an image visibility restoration method in terms of functional block diagrams in accordance with one of the exemplary embodiments of the disclosure.

The proposed image visibility restoration method may be summarized by FIG. 4 in terms of functional block diagrams in accordance with one of the exemplary embodiments of the disclosure.

Referring to FIG. 4, a localized light detection module 420 receives an incoming hazy image 410a from the image receiving module 410 and eliminates a non-localized light region to obtain an elimination result 424a in a light spot alarm operation 424. Next, localized light sources are detected in a patch size selection operation 426 via a FLD technique based on the result from a discriminative feature extraction operation 422 performed in a training stage. Also in the patch size selection operation 426, a designated patch size is determined based on a localized light source detected result 426a. In order to avoid color shifts, an adaptable parameter generation module 430 performs a color statistics and analysis 432 on the incoming hazy image 410*a* as well as performs a chromatic adaptable parameter calculation 434 for generating chromatic adaptable parameters. In a dual dark channel prior procedure 411, an image recovery module 440 determines a dark channel 443 with the designated patch size and a dark channel 442 with small patch size (e.g. 3×3), where a transmission map 444*a* is generated in a transmission map generation operation 444 based on a determined dark channel 442*a* and atmospheric light 445 is estimated in an atmospheric light estimation operation 445 based on a determined dark channel 443*a*. In an image dehazing procedure 448, a de-hazed image 450*a* is produced via the dual channel prior technique and the chromatic adaptable parameters produced by the adaptable parameter generation module 430. An image output module 450 outputs the de-hazed image 450*a* and completes the image visibility restoration method.

In view of the aforementioned descriptions, based on a FLD-based DDCP scheme via the conjunctive utilization of localized light detection, adaptable parameter generation, and image recovery, the disclosure is able to solve the problems associated with the presence of localized light sources and color shifts, and thereby achieve effective image restoration.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image visibility restoration method based on a Fisher's Linear Discriminant-based Dual Dark Channel Prior (FLD-based DDCP), adapted to an image processing apparatus, comprising:

receiving a plurality of training images corresponding to a plurality of image sizes and a plurality of classes, wherein each of the classes corresponds to a localized light source;

generating a plurality of discriminant patterns from the training images based on a Fisher's Linear Discriminant (FLD) model;

receiving an incoming hazy image comprising a plurality of incoming pixels and classifying each of the incoming pixels as either belonging to a localized light region or a non-localized light region according to intensity values of the incoming pixels;

partitioning the localized light region into a plurality of patches according to each patch size in associated with the image sizes;

determining whether each of the patches belongs to a localized light patch based on the FLD model corresponding to each of the patch sizes and determining a designated patch size among the patch sizes accordingly;

determining a set of adaptable chromatic parameters respectively corresponding to each color channel according to the intensity values of the incoming pixels in each of the color channels;

determining dual dark channels respectively corresponding to the designated patch size and a small patch size;

determining atmospheric light in each of the color channels according to the dark channel corresponding to the designated patch size and determining a transmission map according to the dark channel corresponding to the small patch size;

restoring the incoming hazy image in each of the channels according to according to the corresponding set of adaptive chromatic parameters, the corresponding atmospheric light, and the transmission map so as to produce a de-hazed image; and outputting the de-hazed image.

2. The method of claim 1, wherein the step of generating the discriminant patterns from the training images based on the FLD model comprises:

calculating a between-class scatter matrix and a within-class scatter matrix corresponding to each of the image sizes of the training images;

calculating an optimal projection vector corresponding to each of the image sizes of the training images by maximizing a ratio of the corresponding between-class scatter matrix and the corresponding within-class scatter matrix; and obtaining each of the discriminant patterns according to the corresponding optimal projection vector and the corresponding training image.

3. The method of claim 2, wherein the formulas for generating the discriminant patterns from the training images based on the FLD model comprise Eq. (1)-Eq. (4):

$$S_B^f = \sum_{i=1}^{H} n_i(u_i - u)(u_i - u)^T \quad \text{Eq. (1)}$$

$$S_W^f = \sum_{i=1}^{H} \sum_{x_k \in x_i} (x_k - u_i)(x_k - u_i)^T \quad \text{Eq. (2)}$$

wherein $S_B^f$ is the between-class scatter matrix corresponding to the image size f, $S_W^f$ is the within-class scatter matrix corresponding to the image size f, u and $u_i$ represent a mean training image of all the classes and a mean training image of the $i^{th}$ class respectively, $n_i$ represents the number of the training images in the $i^{th}$ class, $x_k$ represents the $k^{th}$ training image in the $i^{th}$ class, H represents the number of all the classes, and H is a positive integer, $$W_{opt}^f = \arg\max_W \frac{|W^T S_B^f W|}{|W^T S_W^f W|} = [w_1, w_2, \cdots, w_r] \quad \text{Eq. (3)}$$

wherein $W_{opt}^f$ is the optimal projection vector corresponding to the image size f, $[w_1, w_2, \ldots, w_r]$ represents a set of generalized eigenvectors of $S_B^f$ and $S_W^f$, r is an empirical lower-dimensional value, r is a positive integer and r<H, and $$Z_k^f = (W_{opt}^f)^T x_k \quad \text{Eq. (4)}$$

wherein $Z_k^f$ is the discriminant pattern corresponding to the $k^{th}$ training image with the image size f.

4. The method according to claim 1, wherein the color channels comprises a red (R) channel, a green (G) channel, and a blue (B) channel, and wherein the step of classifying each of the incoming pixels as either belonging to the localized light region or the non-localized light region according to the intensity values of the incoming pixels comprises:

calculating a probability of an occurrence of each of the intensity values of the incoming pixels in the G channel so as to obtain a corresponding probability mass function (pmf) evaluation;

determining a highest probability value among the pmf evaluations and set the intensity value corresponding to the highest probability value as a binary mask threshold;

determining if the intensity value of each of the incoming pixels in the G channel exceeds the binary mask threshold;

if yes, classifying the corresponding incoming pixel as belonging to the localized light region; and if no, classifying the corresponding incoming pixel as belonging to the non-localized light region.

5. The method according to claim 4, wherein the formulas for classifying each of the incoming pixels as either belonging to the localized light region or the non-localized light region according to the intensity values of the incoming pixels comprise Eq. (5)-Eq. (6):

$$PMF(I^g) = \frac{n_{I^g}}{MN} \quad \text{Eq. (5)}$$

wherein $PMF(I^g)$ is the pmf evaluation corresponding to the intensity value g within the G channel of the incoming hazy image I, and MN is the number of incoming pixels, $$B(x, y) = \begin{cases} 1, & \text{if } I(x, y) > \delta \\ 0, & \text{otherwise} \end{cases} \quad \text{Eq. (6)}$$

wherein B(x,y) is a binary mask of the incoming pixel at (x,y), and $\delta$ is the binary mask threshold and $$\delta = \max_{0 \leq g \leq 255} PMF(I^g).$$

6. The method according to claim 5, wherein the steps of determining whether each of the patches belongs to the localized light patch based on the FLD model corresponding to each of the patch sizes and determining the designated patch size among the patch sizes accordingly comprise:

for each of the patch sizes:
calculating a projection of each of the patches;
determining if a similarity level between each of the projections and the corresponding optimal projection vector exceeds an empirical threshold;
if yes, determining that the corresponding patch does not belong to the localized light patch;
if no, determining that the corresponding patch belongs to the localized light patch; and
accumulating the number of the patches belonging to the localized light patch for each of the patch sizes; and
assigning the patch size with the maximum number of the patches belong to the localized light patch as the designated patch size.

7. The method according to claim 6, wherein the formulas for determining whether each of the patches belongs to the localized light patch based on the FLD model corresponding to each of the patch sizes comprise Eq. (7)-Eq. (8):

$$T_k^f = (W_{opt}^f)^T I_k B_k \quad \text{Eq. (7)}$$

wherein $T_k^f$ is the projection of the $k^{th}$ patch in the incoming hazy image with the patch size f, and $I_k$ is the $k^{th}$ patch in the incoming hazy image, $$I_k \in \begin{cases} \text{class1}, & \text{if } \|Z_k^f - T_k^f\| > \Delta \\ \text{class2}, & \text{if } \|Z_k^f - T_k^f\| \leq \Delta \end{cases} \quad \text{Eq. (8)}$$

8. The method according to claim 7, wherein the formulas for determining the set of adaptable chromatic parameters respectively corresponding to each of the color channels according to the intensity values of the incoming pixels in each of the color channels comprise Eq. (9)-Eq. (10):

$$\left[ \frac{\frac{1}{MN} \sum_{x=1}^{M} \sum_{y=1}^{N} I^{g^2}(x, y)}{\max_{0 \leq x \leq M \cap 0 \leq y \leq N} \{I^{g^2}(x, y)\}} \quad \frac{\frac{1}{MN} \sum_{x=1}^{M} \sum_{y=1}^{N} I^g(x, y)}{\max_{0 \leq x \leq M \cap 0 \leq y \leq N} \{I^g(x, y)\}} \right] \quad \text{Eq. (9)}$$

$$\begin{bmatrix} \mu^r \\ \nu^r \end{bmatrix} = \begin{bmatrix} \frac{\frac{1}{MN} \sum_{x=1}^{M} \sum_{y=1}^{N} I^r(x, y)}{\max_{0 \leq x \leq M \cap 0 \leq y \leq N} \{I^r(x, y)\}} \end{bmatrix}$$

$$\left[ \frac{\frac{1}{MN} \sum_{x=1}^{M} \sum_{y=1}^{N} I^{b^2}(x, y)}{\max_{0 \leq x \leq M \cap 0 \leq y \leq N} \{I^{b^2}(x, y)\}} \quad \frac{\frac{1}{MN} \sum_{x=1}^{M} \sum_{y=1}^{N} I^b(x, y)}{\max_{0 \leq x \leq M \cap 0 \leq y \leq N} \{I^b(x, y)\}} \right] \quad \text{Eq. (10)}$$

$$\begin{bmatrix} \mu^b \\ \nu^b \end{bmatrix} = \begin{bmatrix} \frac{\frac{1}{MN} \sum_{x=1}^{M} \sum_{y=1}^{N} I^r(x, y)}{\max_{0 \leq x \leq M \cap 0 \leq y \leq N} \{I^r(x, y)\}} \end{bmatrix}$$

wherein $(\mu^r, \nu^r)$ and $(\mu^b, \nu^b)$ are the sets of adaptive chromatic parameters corresponding to the R channel and the B channel.

9. The method according to claim 8, wherein the formulas for determining the dual dark channels respectively corresponding to the designated patch size and the small patch size comprise Eq. (11)-Eq. (12):

$$I_\tau^{dark}(x, y) = \min_{(i,j) \in \tau(x,y)} \left( \min_{c \in (r,g,b)} I^c(x, y) \right) \quad \text{Eq. (11)}$$

-continued $$I_\omega^{dark}(x, y) = \min_{(i,j)\in\omega(x,y)}\left(\min_{c\in(r,g,b)} I^c(x, y)\right) \quad \text{Eq. (12)}$$

wherein $I_\tau^{dark}$ and $I_\omega^{dark}$ represents the dual dark channels corresponding to the designated patch size ω and the small patch size τ, and $I^c(x,y)$ represents the incoming pixel at (x,y) in the color channel c.

10. The method according to claim 9, wherein the formulas for restoring the input hazy image in each of the channels according to according to the corresponding set of adaptive chromatic parameters, the corresponding atmospheric light, and the transmission map so as to produce the de-hazed image comprise Eq. (13)-Eq. (14):

$$t(x,y)=1-\omega I_\tau^{dark}(x,y) \quad \text{Eq. (13)}$$

wherein t(x,y) is the transmission map, and ω is a constant parameter ranging between 0 and 1, $$J^c(x, y) = \frac{\mu^c(I^{c^2}(x, y) - A^{c^2}) + \nu^c(I^c(x, y) - A^c)}{\max(t(x, y), t_0)} + (\mu^c A^{c^2} + \nu^c A^c) \quad \text{Eq. (14)}$$

wherein $J^c$ represents de-hazed image in the color channel c, $I^c(x,y)$ represents the incoming hazy image, $A^c$ represents the atmospheric light in the color channel c, and $t_0$ is a lower transmission bound.

11. An image processing apparatus, comprising:
a data storage unit; and
a processing unit, coupled to the data storage unit and configured for:
  receiving a plurality of training images corresponding to a plurality of image sizes and a plurality of classes and receiving an incoming hazy image comprising a plurality of incoming pixels, wherein each of the classes corresponds to a localized light source;
  generating a plurality of discriminant patterns from the training images based on a Fisher's Linear Discriminant (FLD) model, classifying each of the incoming pixels as either belonging to a localized light region or a non-localized light region according to intensity values of the incoming pixels, partitioning the localized light region into a plurality of patches according to each patch size in associated with the image sizes, determining whether each of the patches belongs to a localized light patch based on the FLD model corresponding to each of the patch sizes, and determining a designated patch size among the patch sizes accordingly;
  determining a set of adaptable chromatic parameters respectively corresponding to each color channel according to the intensity values of the incoming pixels in each of the color channels;
  determining dual dark channels respectively corresponding to the designated patch size and a small patch size, determining atmospheric light in each of the color channels according to the dark channel corresponding to the designated patch size and determining a transmission map according to the dark channel corresponding to the small patch size, and restoring the incoming hazy image in each of the channels according to according to the corresponding set of adaptive chromatic parameters, the corresponding atmospheric light, and the transmission map so as to produce a de-hazed image; and
  outputting the de-hazed image.

12. The image processing apparatus according to claim 11, wherein the processing unit calculates a between-class scatter matrix and a within-class scatter matrix corresponding to each of the image sizes of the training images, calculates an optimal projection vector corresponding to each of the image sizes of the training images by maximizing a ratio of the corresponding between-class scatter matrix and the corresponding within-class scatter matrix, and obtains each of the discriminant patterns according to the corresponding optimal projection vector and the corresponding training image.

13. The image processing apparatus according to claim 12, wherein the processing unit generates the discriminant patterns from the training images based on the FLD model according to Eq. (1)-Eq. (4):

$$S_B^f = \sum_{i=1}^{H} n_i(u_i - u)(u_i - u)^T \quad \text{Eq. (1)}$$

$$S_W^f = \sum_{i=1}^{H} \sum_{x_k \in x_i} (x_k - u_i)(x_k - u_i)^T \quad \text{Eq. (2)}$$

wherein $S_B^f$ is the between-class scatter matrix corresponding to the image size f, $S_W^f$ is the within-class scatter matrix corresponding to the image size f, u and $u_i$ represent a mean training image of all the classes and a mean training image of the $i^{th}$ class respectively, $n_i$ represents the number of the training images in the $i^{th}$ class, $x_k$ represents the $k^{th}$ training image in the $i^{th}$ class, H represents the number of all the classes, and H is a positive integer, $$W_{opt}^f = \arg\max_W \frac{|W^T S_B^f W|}{|W^T S_W^f W|} = [w_1, w_2, \ldots, w_r] \quad \text{Eq. (3)}$$

wherein $W_{opt}^f$ is the optimal projection vector corresponding to the image size f, $[W_1, W_2, \ldots, W_r]$ represents a set of generalized eigenvectors of $S_B^f$ and $S_W^f$, r is an empirical lower-dimensional value, r is a positive integer and r<H, and $$Z_k^f = (W_{opt}^f)^T X_k \quad \text{Eq. (4)}$$

wherein $Z_k^f$ is the discriminant pattern corresponding to the $k^{th}$ training image with the image size f.

14. The image processing apparatus according to claim 11, wherein the processing unit calculates a probability of an occurrence of each of the intensity values of the incoming pixels in the G channel so as to obtain a corresponding probability mass function (pmf) evaluation, determines a highest probability value among the pmf evaluations and set the intensity value corresponding to the highest probability value as a binary mask threshold, and determines if the intensity value of each of the incoming pixels in the G channel exceeds the binary mask threshold, wherein if yes, the processing unit classifies the corresponding incoming pixel as belonging to the localized light region, and wherein if no, the processing unit classifies the corresponding incoming pixel as belonging to the non-localized light region.

15. The image processing apparatus according to claim 14, wherein the processing unit classifies each of the incoming pixels as either belonging to the localized light region or the non-localized light region according to the intensity values of the incoming pixels based on Eq. (5)-Eq. (6):

$$PMF(I^g) = \frac{n_{I^g}}{MN} \quad \text{Eq. (5)}$$

wherein $PMF(I^g)$ is the pmf evaluation corresponding to the intensity value g within the G channel of the incoming hazy image I, and MN is the number of incoming pixels, $$B(x, y) = \begin{cases} 1, & \text{if } I(x, y) > \delta \\ 0, & \text{otherwise} \end{cases} \quad \text{Eq. (6)}$$

wherein $B(x,y)$ is a binary mask of the incoming pixel at $(x,y)$, and $\delta$ is the binary mask threshold and $$\delta = \max_{0 \leq g \leq 255} PMF(I^g).$$

16. The image processing apparatus according to claim 15, wherein for each of the patch sizes, the processing unit calculates a projection of each of the patches, determines if a similarity level between each of the projections and the corresponding optimal projection vector exceeds an empirical threshold, wherein if yes, the processing unit determines that the corresponding patch does not belong to the localized light patch, wherein if no, the processing unit determines that the corresponding patch belongs to the localized light patch, and wherein the processing unit accumulates the number of the patches belonging to the localized light patch for each of the patch sizes and assigns the patch size with the maximum number of the patches belong to the localized light patch as the designated patch size.

17. The image processing apparatus according to claim 16, wherein the processing unit deteimines whether each of the patches belongs to the localized light patch based on the FLD model corresponding to each of the patch sizes based on Eq. (7)-Eq. (8):

$$T_k^f = (W_{opt}^f)^T I_k B_k \quad \text{Eq. (7)}$$

wherein $T_k^f$ is the projection of the $k^{th}$ patch in the incoming hazy image with the patch size f, and $I_k$ is the $k^{th}$ patch in the incoming hazy image, $$I_k \in \begin{cases} \text{class1}, & \text{if } \|Z_k^f - T_k^f\| > \Delta \\ \text{class2}, & \text{if } \|Z_k^f - T_k^f\| \leq \Delta \end{cases}. \quad \text{Eq. (8)}$$

18. The image processing apparatus according to claim 17, wherein the processing unit determines the set of adaptable chromatic parameters respectively corresponding to each of the color channels according to the intensity values of the incoming pixels in each of the color channels based on Eq. (9)-Eq. (10):

$$\begin{bmatrix} \frac{1}{MN}\sum_{x=1}^{M}\sum_{y=1}^{N} I^{g^2}(x, y) & \frac{1}{MN}\sum_{x=1}^{M}\sum_{y=1}^{N} I^g(x, y) \\ \max_{0 \leq x \leq M \cap 0 \leq y \leq N}\{I^{g^2}(x, y)\} & \max_{0 \leq x \leq M \cap 0 \leq y \leq N}\{I^g(x, y)\} \end{bmatrix} \quad \text{Eq. (9)}$$

$$\begin{bmatrix} \mu^r \\ \nu^r \end{bmatrix} = \begin{bmatrix} \frac{1}{MN}\sum_{x=1}^{M}\sum_{y=1}^{N} I^r(x, y) \\ \max_{0 \leq x \leq M \cap 0 \leq y \leq N}\{I^r(x, y)\} \end{bmatrix}$$

$$\begin{bmatrix} \frac{1}{MN}\sum_{x=1}^{M}\sum_{y=1}^{N} I^{b^2}(x, y) & \frac{1}{MN}\sum_{x=1}^{M}\sum_{y=1}^{N} I^b(x, y) \\ \max_{0 \leq x \leq M \cap 0 \leq y \leq N}\{I^{b^2}(x, y)\} & \max_{0 \leq x \leq M \cap 0 \leq y \leq N}\{I^b(x, y)\} \end{bmatrix} \quad \text{Eq. (10)}$$

$$\begin{bmatrix} \mu^b \\ \nu^b \end{bmatrix} = \begin{bmatrix} \frac{1}{MN}\sum_{x=1}^{M}\sum_{y=1}^{N} I^r(x, y) \\ \max_{0 \leq x \leq M \cap 0 \leq y \leq N}\{I^r(x, y)\} \end{bmatrix}$$

wherein $(\mu^r, \nu^r)$ and $(\mu^b, \nu^b)$ are the sets of adaptive chromatic parameters corresponding to the R channel and the B channel.

19. The image processing apparatus according to claim 18, wherein the processing unit determines the dual dark channels respectively corresponding to the designated patch size and the small patch size based on Eq. (11)-Eq. (12):

$$I_\tau^{dark}(x, y) = \min_{(i,j) \in \tau(x,y)}\left(\min_{c \in (r,g,b)} I^c(x, y)\right) \quad \text{Eq. (11)}$$

$$I_\omega^{dark}(x, y) = \min_{(i,j) \in \omega(x,y)}\left(\min_{c \in (r,g,b)} I^c(x, y)\right) \quad \text{Eq. (12)}$$

wherein $I_\tau^{dark}$ and $I_\omega^{dark}$ represents the dual dark channels corresponding to the designated patch size $\omega$ and the small patch size $\tau$, and $I^c(x,y)$ represents the incoming pixel at $(x,y)$ in the color channel c.

20. The image processing apparatus according to claim 19, wherein the processing unit restores the input hazy image in each of the channels according to according to the corresponding set of adaptive chromatic parameters, the corresponding atmospheric light, and the transmission map so as to produce the de-hazed image based on Eq. (13)-Eq. (14):

$$t(x,y) = 1 - \omega I_\tau^{dark}(x,y) \quad \text{Eq. (13)}$$

wherein $t(x,y)$ is the transmission map, and $\omega$ is a constant parameter ranging between 0 and 1, $$J^c(x, y) = \frac{\mu^c(I^{c^2}(x, y) - A^{c^2}) + \nu^c(I^c(x, y) - A^c)}{\max(t(x, y), t_0)} + (\mu^c A^{c^2} + \nu^c A^c) \quad \text{Eq. (14)}$$

wherein $J^c$ represents de-hazed image in the color channel c, $I^c(x,y)$ represents the incoming hazy image, $A^c$ represents the atmospheric light in the color channel c, and $t_0$ is a lower transmission bound.

\* \* \* \* \*